(12) United States Patent
Lowe et al.

(10) Patent No.: US 10,740,215 B2
(45) Date of Patent: Aug. 11, 2020

(54) SYSTEM AND METHOD FOR IMPLEMENTING AN API VALIDATOR TOOL

(71) Applicant: JPMorgan Chase Bank, N.A., New York, NY (US)

(72) Inventors: Jonathan Lowe, Glasgow (GB); James A. Helly, East Dunbartonshire (GB); Brian Scott, Glasgow (GB); Graham Robertson, Glasgow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 63 days.

(21) Appl. No.: 15/962,590

(22) Filed: Apr. 25, 2018

(65) Prior Publication Data
US 2018/0314622 A1    Nov. 1, 2018

Related U.S. Application Data

(60) Provisional application No. 62/490,176, filed on Apr. 26, 2017, provisional application No. 62/583,039, filed on Nov. 8, 2017.

(51) Int. Cl.
*G06F 11/36* (2006.01)
*G06F 9/445* (2018.01)

(52) U.S. Cl.
CPC ...... *G06F 11/3616* (2013.01); *G06F 9/44526* (2013.01)

(58) Field of Classification Search
None
See application file for complete search history.

(56) References Cited

U.S. PATENT DOCUMENTS

2013/0061211 A1* 3/2013 Rama
2016/0085662 A1* 3/2016 Huang
2016/0092344 A1* 3/2016 Bally
2016/0308900 A1* 4/2016 Sadika

* cited by examiner

*Primary Examiner* — Syed A Roni
(74) *Attorney, Agent, or Firm* — Hunton Andrews Kurth LLP (57) ABSTRACT

The invention relates to an API Validator that allows developers to rate their Open API Specification (e.g., swagger files, API contracts) based on the standards for building APIs. The tool may parse the contract and look for compliance (or non-compliance) with the standards, using algorithms. A detailed report and overall score is presented to the developer once the contract has been checked. An embodiment of the present is directed to a plug-in that enables metrics generation as part of an automated build process. An embodiment of the present invention provides an integration process that enables a developer or other user to automatically resolve validation issues identified with APIs.

20 Claims, 9 Drawing Sheets

API Designer

Select API to edit: Test

Type: JSON  Theme: Light  View  Format  Preview  Save

```
 1  {
 2    "swagger": "2.0",
 3    "info": {
 4      "title": "Capture API",
 5      "description": "Detect the Collision with Capture API",
 6      "version": "1.0.0"
 7    },
 8    "host": "capture.comapnyABC.net/opi",
 9    "schemes": [
10      "https"
11    ],
12    "basePath": "/v1/opi",
13    "produces": [
14      "application/json"
15    ],
16    "paths": {
17      "/Changes/{ChangeNumber}": {
18        "get": {
19          "summary": "Change Details",
20          "description": "The Change end point returns the details of the change. The response includes all the attributes of the change.\n",
21          "parameters": [
22            {
23              "none": "ChangeNumber",
```

API Score: A

Test API

Test API definition

Version 1.0.0

Change
List Operations  Expand Operations

| GET | /Changes/{ChangeNumber} | Change Details |
| GET | /Changes | Present Changes |
| POST | /Changes | Insert Change |
| PUT | /Changes | Update Change |

Event
List Operations  Expand Operations

| GET | /Events | Events overlapping with a Change |

Figure 8

Submit your Swagger

Choose Swagger File

[Browse...]

[Writeable|Read Only]

[Submit]

API Submissions: Test Audit API     [Back]

Version: 1.0.0  — 910
API ID: 1234
Here is a summary of the submissions so far.

| Overall Grade ▽ — 920 | Created ▽ — 930 |
|---|---|
| C | Jun 17, 2017 4:19 PM |
| C | Nov 17, 2017 4:24 PM |
| B | Dec 3, 2017 1:26 PM |
| B | Jan 3, 2018 2:28 PM |
| B | Jan 27, 2018 3:48 PM |
| B | Feb 3, 2018 4:02 PM |
| B | Mar 3, 2018 4:07 PM |
| A | Apr 6, 2018 10:23 AM |

Figure 9

SYSTEM AND METHOD FOR IMPLEMENTING AN API VALIDATOR TOOL

CROSS REFERENCE TO RELATED APPLICATIONS

The application claims priority to U.S. Provisional Application 62/490,176, filed Apr. 26, 2017, and U.S. Provisional Application 62/583,039, filed Nov. 8, 2017, the contents of which are incorporated herein in their entirety.

FIELD OF THE INVENTION

The invention relates generally to a system and method for implementing an Application Program Interface (API) Validator Tool that determines the quality and maturity of an API based on an API Specification and API Standards to enforce good practice and consistency.

BACKGROUND OF THE INVENTION

A RESTful API is based on representational state transfer (REST) technology, an architectural style and approach to communications often used in web services development. REST is popular due to its simplicity and because it builds upon existing systems and features of HTTP in order to achieve its objectives. REST is built on the technologies of the web, allowing systems built with it to exhibit loose coupling, good scalability and make use of the large number of tools available to build with it. An Application Programming Interface (API) is code that allows two software programs to communicate with each other. An API Specification (or contract) identifies the proper way for a developer to write a program requesting services from an operating system or other application.

Because REST is an architectural style, programmers are given a good amount of flexibility. As a result, inexperienced teams creating RESTful APIs, in the absence of guidance, tend to end up with many questions or implement something that is problematic.

These and other drawbacks currently exist.

SUMMARY OF THE INVENTION

According to one embodiment, the invention relates to an API Validator Tool comprising: a first input configured to receive an API definition; a second input configured to receive API standards data; an API Registry component that stores and manages available APIs developed by one or more API developers wherein the API Registry comprises API validation scores; an API Validator plug-in executing on a build platform and configured to perform the steps of: receive a trigger API test; determine whether an API exists; extract an API Specification from the API Registry; perform an API quality validation and generate API status response message.

According to another embodiment, a method for implementing an API Validator Tool comprises the steps of: receiving a trigger API test; determining whether an API exists; extracting an API Specification from the API Registry, wherein the API Registry stores and manages available APIs developed by one or more API developers further comprises API validation scores; performing, via an API Validator plug-in, wherein the API Validator plug-in executes on a build platform; and generating API status response message.

According to yet another embodiment, an API Validator Tool comprises: a first input configured to receive an API definition; a second input configured to receive API standards data; an API Validator interface configured to display validation data; a processor, coupled to the first input, the second input and the API Validator interface, configured to perform the steps of: parsing API definition to identify compliance with the API standards data; generating a set of validators; identifying a score for each of the set of validators; and communicating, via the API Validator interface, the set of validators with corresponding scores.

The system may include a specially programmed computer system comprising one or more computer processors, interactive interfaces, electronic storage devices, and networks.

The computer implemented system, method and medium described herein provide unique advantages to software developers, administrators and other users, according to various embodiments of the invention. The innovative API Validator Tool promotes good practice and enforces consistency across various APIs. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs. While certain nomenclature and types of applications/hardware are described, other names and application/hardware usage is possible and the nomenclature provided is done so by way of non-limiting examples only. The figures provide additional exemplary details regarding the present invention. It should also be appreciated that these exemplary embodiments are provided as non-limiting examples only.

REST is an architectural style, not a strict standard. Therefore, it allows for flexibility amongst programmers of varying levels of experience. An embodiment of the present invention is directed to facilitating the process of defining and consuming APIs. An embodiment of the present invention uses standards to enforce good practice (e.g., well documented APIs, backward versions with upgrade windows, appropriate use of HyperText Transfer Protocol (HTTP) verbs, etc.) as well as enforce consistency. For multiple APIs, the experience across the APIs should be similar and therefore components may be reused.

An embodiment of the present invention is directed to an automated API Validator Tool that enables users, such as developers, to automatically validate API Specifications. API Specifications may include definitions and a set of rules for a format describing REST APIs. The format is both machine-readable and human-readable, and used to share documentation amongst product managers, testers and developers. It may also be used with various tools to automate API-related processes. API Specifications may define a standard, language-agnostic interface to REST APIs which allows both humans and computers to discover and understand the capabilities of the service without access to source code, documentation, or through inspection.

An embodiment of the present invention may determine whether an API Specification meets a set of standards and then grades or scores the API Specification based on the standards as well as other factors and considerations.

Figure 1:
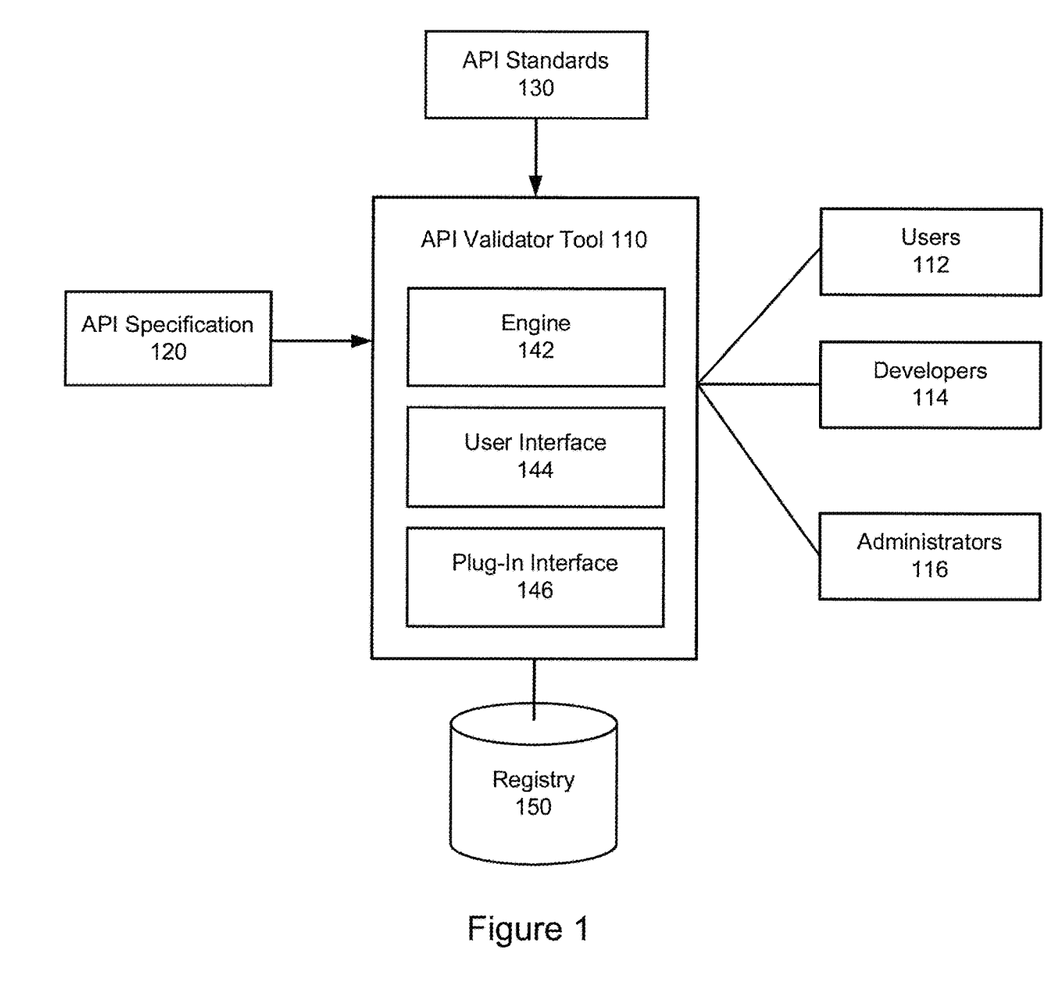
FIG. 1 illustrates a diagram of an API Validator system, according to an embodiment of the present invention.

FIG. 1 illustrates a schematic diagram of an API Validator Tool, according to an exemplary embodiment. An embodiment of the present invention is directed to measuring the quality and/or maturity of an API based on a specification for the API and a set of standards for the API. As shown in FIG. 1, an API Specification 120 may be received by API Validator Tool 110, which then analyzes the API Specification 120 as compared to API Standards 130. API Validator Tool 110 may include Engine 142, User Interface 144 and Plug-In Interface 146. Users may include API Consumers represented by 112, Developers 114 and Administrators 116. The users may interact with API Validator Tool via a User Interface 144 to request and access reports, analysis, metrics and/or other information relating to API validation. API Validator Tool 110 may access Repository 150 or other storage mechanism that stores and manages API Specifications as well as API Standards. Repository 150 may also store prior ratings for analysis, prediction, feedback, reporting and other purposes. Plug-In Interface 146 provides validation functions to an existing platform so that API Specifications may be validated during a build process.

API Specification 120 may include a specification for machine-readable interface files for describing, producing, consuming, and visualizing RESTful web services. A variety of tools may generate code, documentation and test cases given an interface file. Development of the OpenAPI Specification (OAS) is overseen by the Open API Initiative, an open source collaborative project of the Linux Foundation. According to an embodiment of the present invention, APIs have a specification, which may include an Open API Specification or Swagger contract.

API Standards 130 may represent a set of standards for the API which may include API Convention, API Design, API Security, API Data, etc. For example, API Standards may be in various formats, including various models (e.g., maturity models) to grade API according to the constraints of REST. The standards may include a set of guidelines and rules, directed to various functions including convention (e.g., bottom up versus top down implementation, differentiate using base Uniform Resource Identifier (URI), consistent input/output payloads, etc.); design (e.g., versioning APIs, correct use of verbs, choosing request/response versus publish/subscribe, HTTP Response Codes, URI Design, Searching and Filtering, Pagination, etc.); security (e.g., authentication, authorization, auditing, encryption, etc.); Data (e.g., payloads, versioning data elements, reconciliation across API boundaries, data standards, naming standards, checking for use of industry standard data conventions, e.g., date times in ISO 8601 format, etc.); documentation (e.g., use of swagger, etc.); Error Handling (e.g., downstream failures, upstream failures, heartbeats, etc.); Hosting (e.g., change management, exploratory testing, swagger generation, etc.); On-boarding/testing (e.g., comparing API contract to running instance/running stub of API, consumer driven testing, conformance to published non-functional requirements such as response time, etc.).

API Validator Tool 110 allows developers to rate their API Specification (e.g., API contracts) based on the standards defined by an entity or other source for building APIs. The Tool may parse the specification and determine compliance (or non-compliance) with the standards, using specialized algorithms. Engine 142 may execute the algorithms to perform various functions including: checking URL endpoints defined in the supplied swagger file are constructed based on nouns, not verbs; checking the correct HTTP response codes are declared per operation type (e.g., GET, PUT, POST, DELETE, PATCH, etc.); and checking that versioning information is declared in the correct location within the base-path of the service and within resources supplied by the API. A detailed report and overall score may be presented to the developer once the contract has been checked.

Engine 142 of the API Validator Tool 110 may analyze compliance metrics and generate an API Quality Rating. The API Quality Rating may include grades/scores for various features/functions, such as use of HTTP verbs, use of Response Codes, encryption uses, URI structure, payload schema correctness, entity versioning used, API versioning used, etc. The quality ratings are exemplary and non-limiting. Other features and functions may be scored. Grades/Scores may include various forms of measuring or ascertaining compliance. For example, various metrics and/or ranges may be applied (e.g., A, B, C, . . . 1, 2, 3 . . . 80, 90, 100, . . . pass/fail, graphic codes, etc.).

Figure 2:
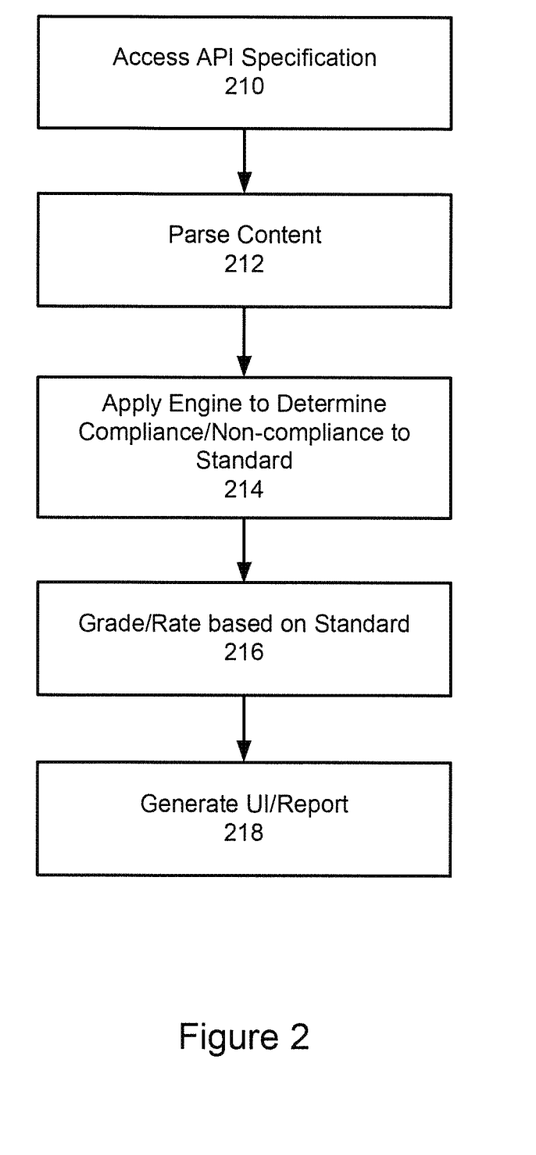
FIG. 2 illustrates an exemplary flowchart for implementing an API Validator system, according to an embodiment of the present invention.

FIG. 2 illustrates an exemplary flowchart for implementing an API Validator system, according to an embodiment of the present invention. At step 210, API Specification may be accessed. The API Specification may include an API definition that identifies how to define paths, parameters, responses, models, security and more. According to an exemplary embodiment, the API Validator Tool may read the API Specification which may be in JSON, YAML, etc. and parse out the content at step 212. At step 214, an engine may determine compliance or non-compliance to the API standard. For example, the engine may apply a set of checks against the content to determine compliance to the standards. At step 216, the engine may generate a score, grade, rating or other indicia in response. At step 218, the results may be provided via a user interface, report and/or other form of communication. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
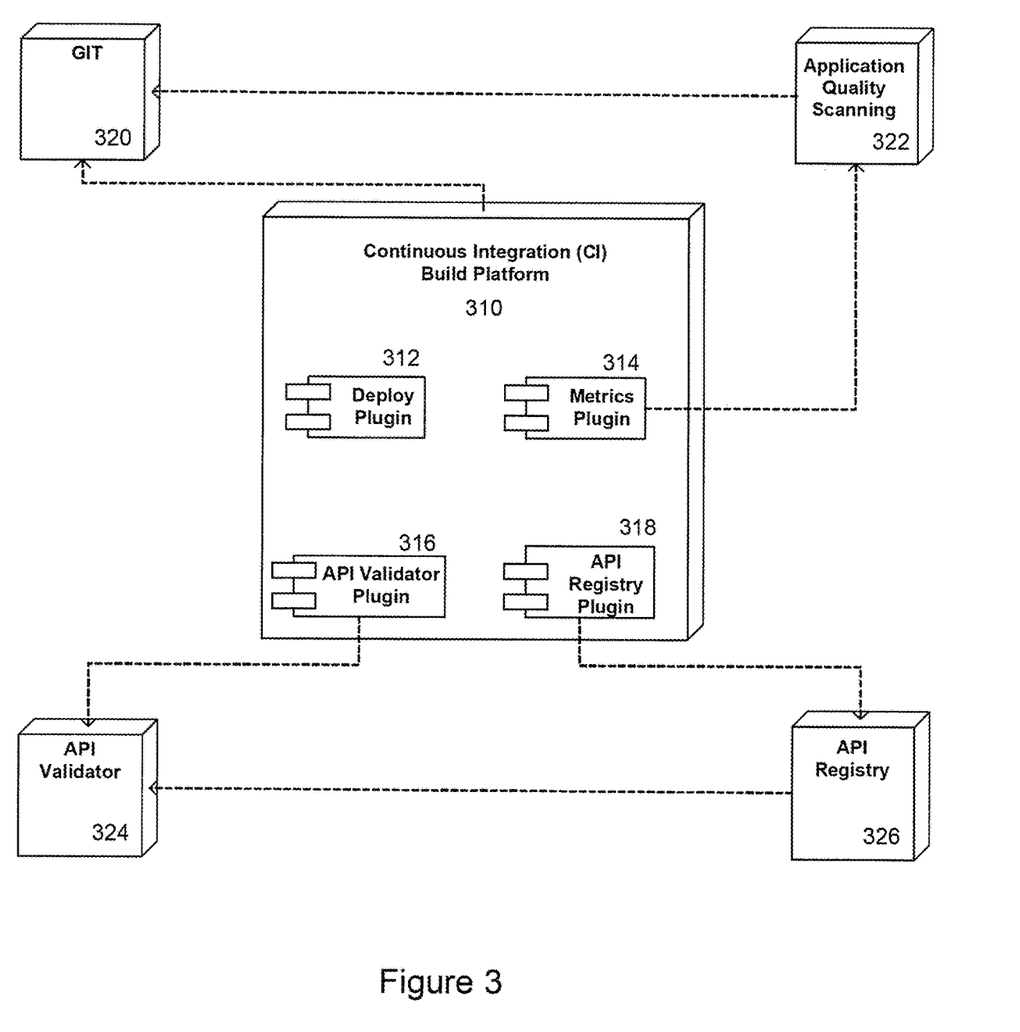
FIG. 3 illustrates a diagram of an API Validator system, according to an exemplary embodiment.

FIG. 3 illustrates a diagram of an API Validator system, according to an exemplary embodiment. The API Validator Tool may be integrated with an API management platform to provide automatic validation of APIs as they are added to the platform. An embodiment of the present invention may implement a plugin or other software component that adds features provided by the Validator Tool to an existing platform. In this configuration, users and teams performing software builds may automatically check API contract definitions as part of a build process.

FIG. 3 illustrates an exemplary configuration where Continuous Integration (CI) Build Platform 310 represents a continuous delivery component. In this example, CI Build Platform 310 includes a Deploy Plugin 312, Metrics Plugin 314, API Validator Plugin 316 and API Registry Plugin 318. Metrics Plugin 314 communicates with Application Quality Scanning component 322, which then communicates with GIT 320. GIT 320 represents a version control system for tracking changes in computer files and coordinating work on those files among various users. GIT 320 may be used for source code management in software development. API Validator Plugin 316 communicates with API Validator 324 which receives input from API Registry 326. API Registry Plugin 318 is in communication with API Registry 326.

Figure 4:
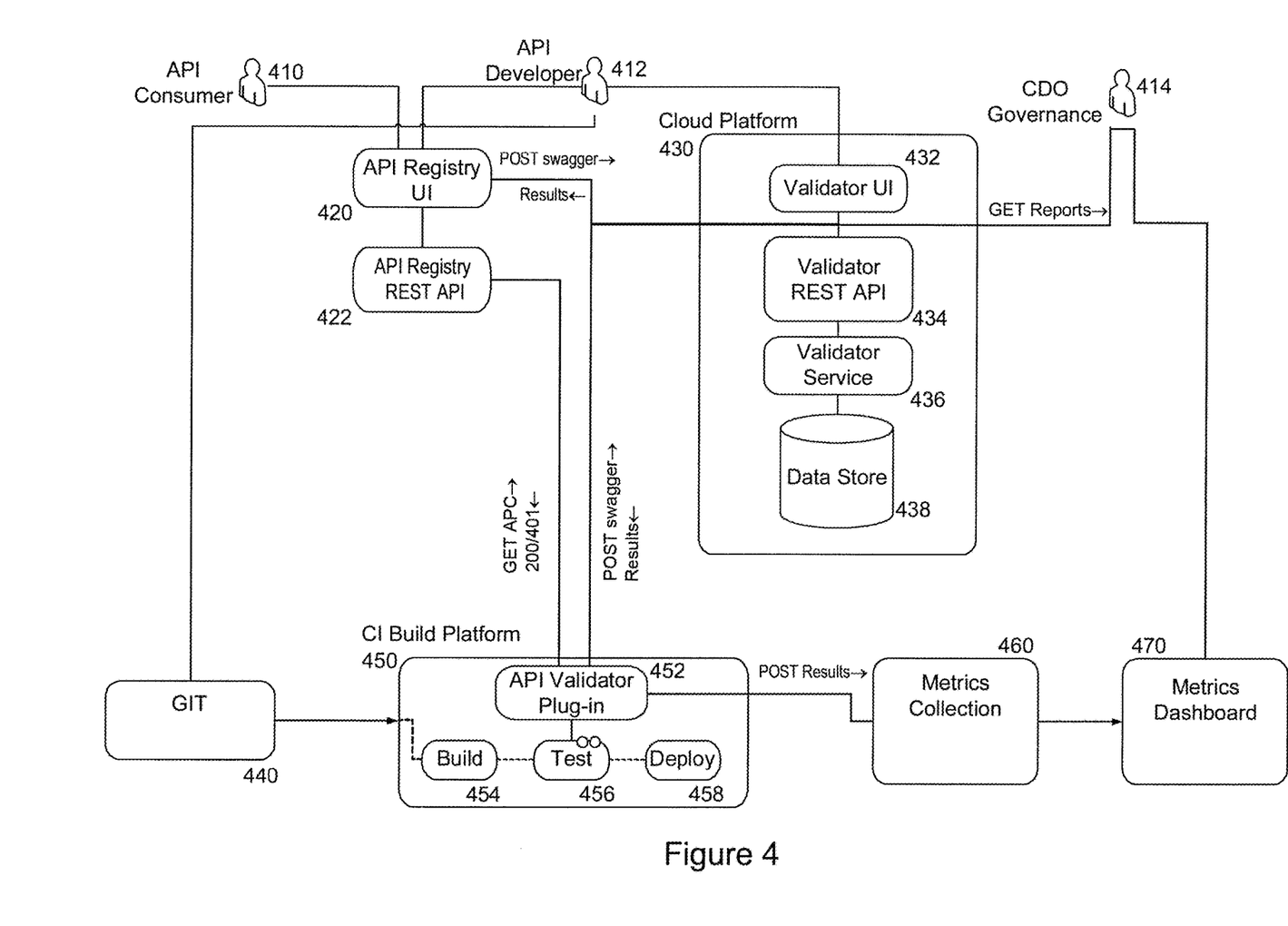
FIG. 4 illustrates a diagram of an API Validator system, according to an exemplary embodiment.

FIG. 4 illustrates a diagram of an API Validator system, according to an exemplary embodiment. The API Validator system may be accessed by various types of users including API Consumer 410, API Developer 412 and Chief Development Office (CDO) Governance 414, API Consumer 410 represents a user who uses the API. API Developer 412 represents a user that develops or creates APIs.

As shown in FIG. 4, API Consumer 410 may access APIs maintained in API Registry 422 through an API Registry UI 420. API Registry 422 stores and manages a registry of APIs, e.g., REST APIs.

API Developer 412 may view batch results through Validator UI 432, via a Cloud Platform 430. API Developer 412 may develop APIs and then store them in API Registry 422 to validate API Specifications. In this example, Validator UI 432 may access Validator REST API 434, Validator Service 436 and Data Store 438. Validator REST API 434 performs various functions, including create API, create API submission, validate API contract and generate validation reports. Validator Service 436 may execute validation algorithms and validation rules. Data Store 438 may store and manage API data, submission data, validator configuration data and/or other information. For example, CDO Governance 414 may pull grading metric reports directly from the validator tool using a programmatic interface (such as an API) in a format that can be imported into a standard reporting tool. This function may also be provided as an administrative function via Validator UI 432.

FIG. 4 illustrates a continuous integration validation flow via a CI Build Platform plugin. An embodiment of the present invention is directed to an API Validator plug-in that enables metrics generation as part of an automated build process. An embodiment of the present invention provides an integration process that enables a developer or other user to automatically resolve APIs. As shown in FIG. 4, CI Build Platform 450 may include an API Validator 452 (e.g., Jenkins Plugin, etc.) and perform various functions, including Build 454, Test 456 and Deploy 458. As shown, API code on which API validation is to be performed may be received from GIT 440 to perform a build function at 454. POST results may be sent from API Validator 452 to Metrics Collection 460. CDO Governance 414 may then view metrics via a Metrics Dashboard (or other interactive user interface) at 470.

As shown in FIG. 4, API Validator 452 may check an API score for an API Specification with the ability to fail a build if an unsatisfactory score was achieved. API Validator 452 may indicate whether a build passes or fails. For example, an embodiment of the present invention may apply thresholds that indicate that if an API score falls below a "B," that build will fail. For an API score B and above, the system may indicate that the build passes. Other scores, metrics and thresholds may be applied as deemed appropriate by quality governance standards.

According to another example, when a Developer 412 checks-in code, the API Validator 452 may perform a validation quality check on the code. The system may make a call to the API Registry 422 to check that the API is registered in the API Registry 422, this may involve searching the API Registry for a identifier associated with the API. The system may then generate or retrieve the API Specification (or contract) that describes the REST API. Once presence of an API in the store is established, a further API quality check may be achieved. Also, the existence of a corresponding entry of the API in the API Registry may be achieved through alternative application identifiers used within other application and software registries used within an organization. API Validator 452 may request data from API Registry 422 through a GET command. API Validator 452 may also post data back to the API registry (such as historic quality metrics) for dissemination to API developers and the wider engineering community.

An embodiment of the present invention provides duplicate API detection. For example, the system may check if a new API offering from a service is already available in an API Registry. The system may notify or alert the user that this API may already exist and recommend clarifying if the new API is duplicating existing services. The system may use data analytic algorithms to look for these similarities.

An embodiment of the present invention may provide conformance to canonical model validation. For example, the system may provide standard data models across an enterprise, not competing, duplicative versions. The system may check an API for adherence (or not) to a data standard. This feature may involve persisting definitions in some form. In addition, new APIs may be compared to existing definitions.

An embodiment of the present invention may include a breaking change detector. With this feature, the system may determine differences between two versions of an API Specification (or contract) and notify the user if there are breaking changes between the two versions. The system may also recommend an approach to user if breaking changes are detected.

An embodiment of the present invention may provide validation variations where the system enables the user to choose what type of API to validate. This may be applicable when not all rules apply to certain types of API.

An embodiment of the present invention may provide facilitates rule generation and modification. The system allows rules to be added easily without a code deployment. With this feature, a macro language may be implemented to describe new validation rules.

Figure 5:
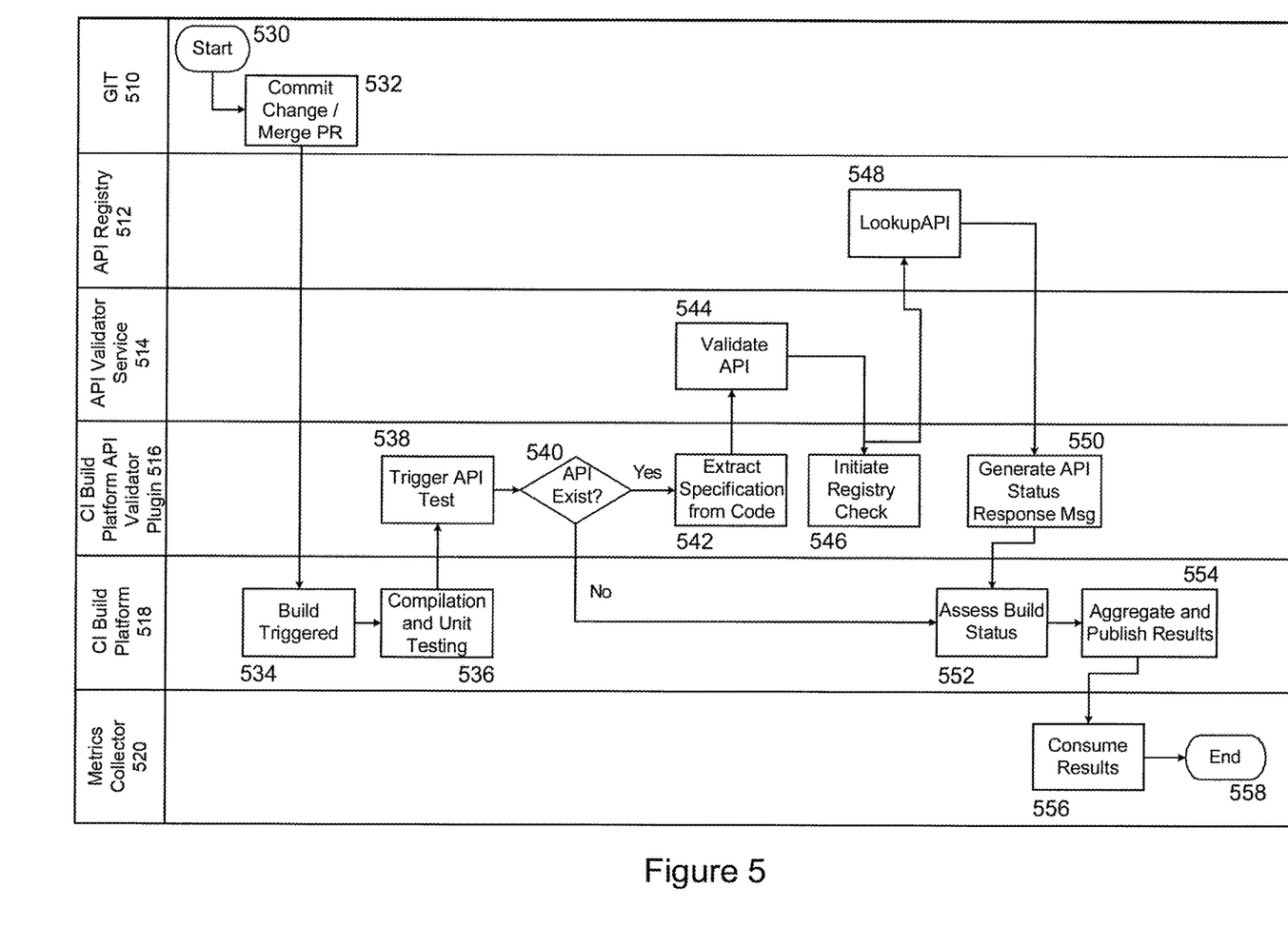
FIG. 5 illustrates an API Validation flowchart, according to an exemplary embodiment.

FIG. 5 illustrates an API Validation flowchart, according to an exemplary embodiment. In the process flow view, the CI Build Platform plugin enhances an existing build pipeline. For example, an embodiment of the present invention determines presence of an API as part of a component (e.g., scan for "give away" code, such as import statements or annotations). FIG. 5 further shows sending a contract for API to validator service (which may already exist) to determine API quality. An embodiment of the present invention further queries an API Registry for the presence of an API thereby ensuring the presence of an API in an API Registry being a possible quality check. The system may further package up results to pass back control to CI Build Platform pipeline and then used as input into overall build success or failure.

FIG. 5 illustrates interaction between and among various components including GIT 510, API Registry 512, API Validator Service 514, CI Platform API Validator Plugin 516, CI Build Platform 518 and Metrics Collector 520. As shown in FIG. 5, a process may be initiated to commit change and/or merge code following a developer peer review at 532. A build may be triggered at 534 that involves compilation and unit testing at 536. CI Build Platform API Validator Plugin may receive a trigger for an API Test at 538. CI Build Platform API Validator Plugin may determine whether an API exists at 540. If yes, API Specification may be extracted from code at 542. The API may be validated at 544 and then a registry check may be initiated at 546. An API Registry may perform a lookup at 548. API Validator Plugin may then request quality score of API swagger contract at 550. Build status may be accessed at 552. Results may be aggregated and then published at 554 and transmitted to Metrics Collector at 556.

Figure 6:
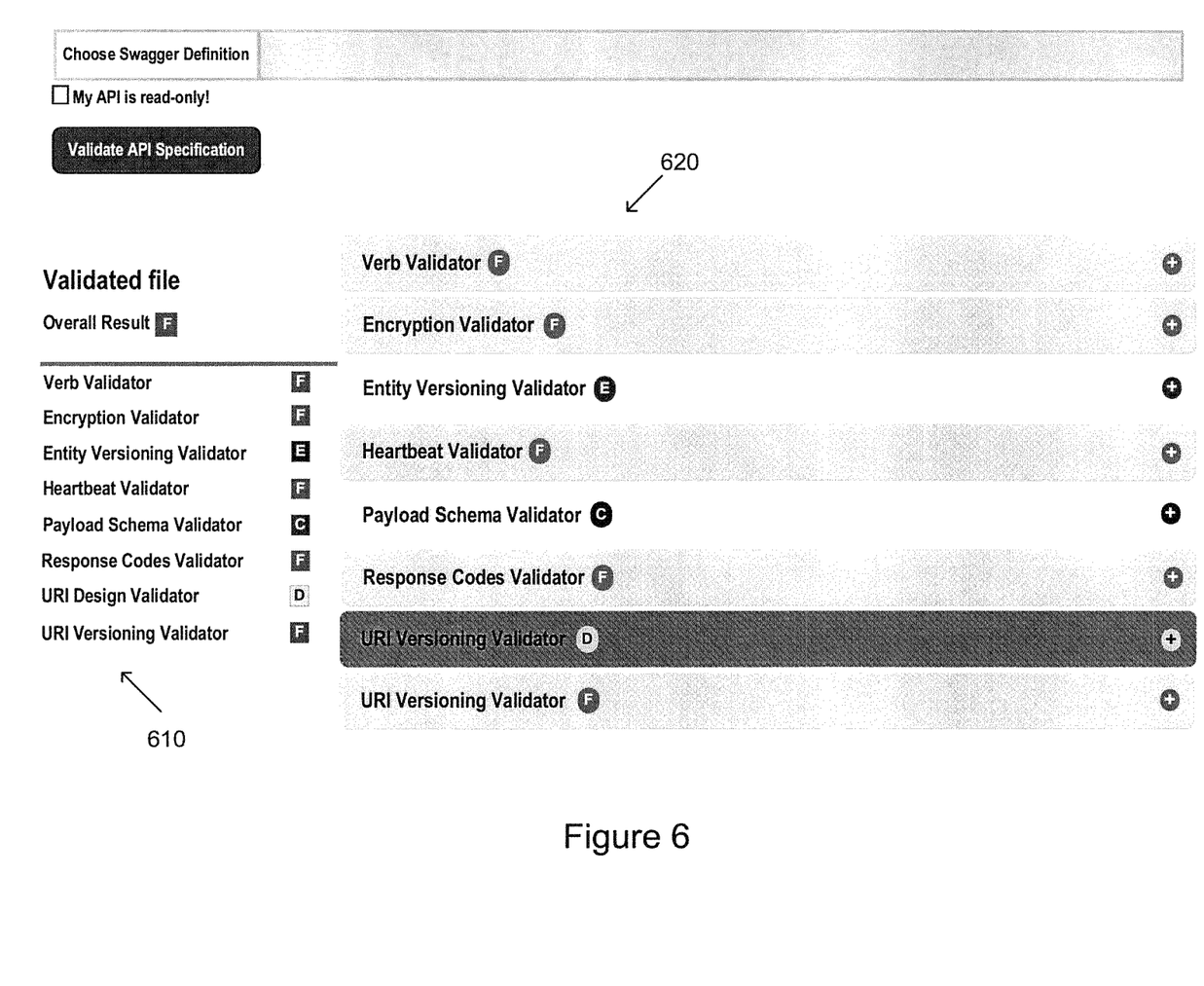
FIG. 6 illustrates exemplary screenshots of API Validation user interfaces, according to an exemplary embodiment.

FIG. 6 illustrates exemplary screenshots of API Validation user interfaces, according to an exemplary embodiment. In the example of FIG. 6, a Validated File is determined to be a bad file. As shown in FIG. 6, the Validated File may include a grade or score based on various features or validators at 610, such as Verb Validator, Encryption Validator, Entity Versioning Validator, Heartbeat Validator, Payload Schema Validator, Response Codes Validator, URI Design Validator and URI Versioning Validator. Additional Details for the grade/score may be provided at 620, by selecting a validator.

Verb Validator may check for the correct use of verbs in the API declaration. APIs that have a single "GET" endpoint would typically indicate an immature API (unless it is read-only). APIs with a mix of "GET," "POST," "PUT" and "DELETE" would indicate a mature API. For example, Verb Validator may provide validation errors, such as "Only GET endpoint present, suggests low maturity level."

Encryption Validator may check that only an https scheme is defined in the API Specification. For example, Encryption Validator may provide validation errors, such as "Invalid or no schema present Error: No Schema present."

Entity Versioning Validator may examine returned entities in payloads and review whether there is any entity versioning present. This may be encoded in a particular format. For example, Entity Versioning Validator may provide validation errors and validation messages, such as "No entity version information detected in JSON model within swagger contract."

Heartbeat Validator may scan for existing API availability checking actions and look for endpoints with a resource named: "heartbeat" or "ping," for example. For example, Heartbeat Validator may provide validation warnings, such as "No heartbeat endpoint found."

Payload Schema Validator may determine if there are sufficient API request and response schema information descriptions. In order for users of an API to understand what to send (body) and what will be returned, examples should be given by the author of the API. These may be present in the "definitions" section of the API Specification. For example, Payload Schema Validator may provide validation errors, such as "Failed to load any Schema Definitions," and validation messages, such as "Schema Found for all paths."

Response Codes Validator may review the verbs used on each endpoint and determine a complete set of expected response codes. For example, an immature API may only use a small subset of response codes, or even 200 for all responses. In contrast, a mature API may use 200 for a successful GET or DELETE (201 for a successful POST or PUT), 400 for a badly formed request, 401 for an unauthenticated request, 403 for a forbidden request, 409 for a conflict or rule violation, and 500 for internal errors. 201 is acceptable for a POST, while 404 is only applicable for a search path or a path that includes an identifier. Analysis may be based on the verbs used in the API. For example, Response Codes Validator may provide validation errors, such as "Missing response codes," and validation messages, such as "Only found a 200 response code used for all responses, suggests low maturity level."

For URI Design Validator, APIs may typically have two base URIs per resource: one for acting on single instances, and the other for acting on collections of that resource. Resources should be named as nouns as opposed to verbs or actions. In order to query hierarchical and related resources, APIs should have a defined set of collections, sub-collections and items. For example, URI Design Validator may provide validation errors, such as "The word 'post' in token/post is not recommended as this should be implied by the verb 'POST'—please use nouns in the URI," and validation messages, such as "Below are the paths that were found that show GOOD design."

URI Versioning Validator may determine if the base URL presented in the API Specification includes a version number defined in a standard format.

An embodiment of the present invention may be directed to additional enhancements, which may include Rating Trends, Tooling Integration and Plugin. For Rating Trends, the system may analyze teams, lines of business and/or other user groupings of metrics which may identify who is trending towards failure or pass. Also, the system may support an integration with an API Store (e.g., registry) to facilitate gamification of the process. For Tooling Integration, an embodiment of the present invention may produce a build report in formats that are understood by commonly used quality tools, such as Jenkins, Sonar, etc. For Plugin, an embodiment of the present invention may provide the API Validator Tool as a plugin that teams may use to validate local builds.

An embodiment of the present invention may be directed to additional enhancements, which may include API Style Tuning, Swagger Differences, Broaden Contract Type Support, and Runtime Validation. For API Style Tuning, API validation by API type may include read only; crud; callback, etc. As standards are developed, some may only apply to particular types of API. For Swagger Differences, an embodiment of the present invention may compare submissions and view side-by-side swagger changes. For Broaden Contract Type Support, an embodiment of the present invention may support validation of other input formats: including RESTful API Modeling Language (RAML), Web Application Description Language (WADL), for example. An embodiment of the present invention may also validate simple Object Access Protocol (SOAP) APIs (using the WSDL contract for a SOAP API) if some users felt that SOAP was still a style they wanted to support. Other styles and types may be supported. For Runtime Validation, an embodiment of the present invention may confirm that a deployed service's API adheres to the specific contract. Also, the API Validator Tool may call endpoints to confirm.

An embodiment of the present invention may be directed to additional enhancements, which may include Rules Packs, Suggestion Engine and Pseudo language. For Rules Packs, an embodiment of the present invention may provide customization of validation rule packs and give different groups the ability to tune the validation based on their needs. For Suggestion Engine, an embodiment of the present invention may provide a Wizard that takes a model and entity title and walks the user through creating a swagger based on configured standards. The reverse may be applied for validating afterwards. Pseudo language may be implemented to describe validation instructions, a way to go from natural language to a validator that can produce results (e.g., a-f/pass fail, etc.).

Figure 7:
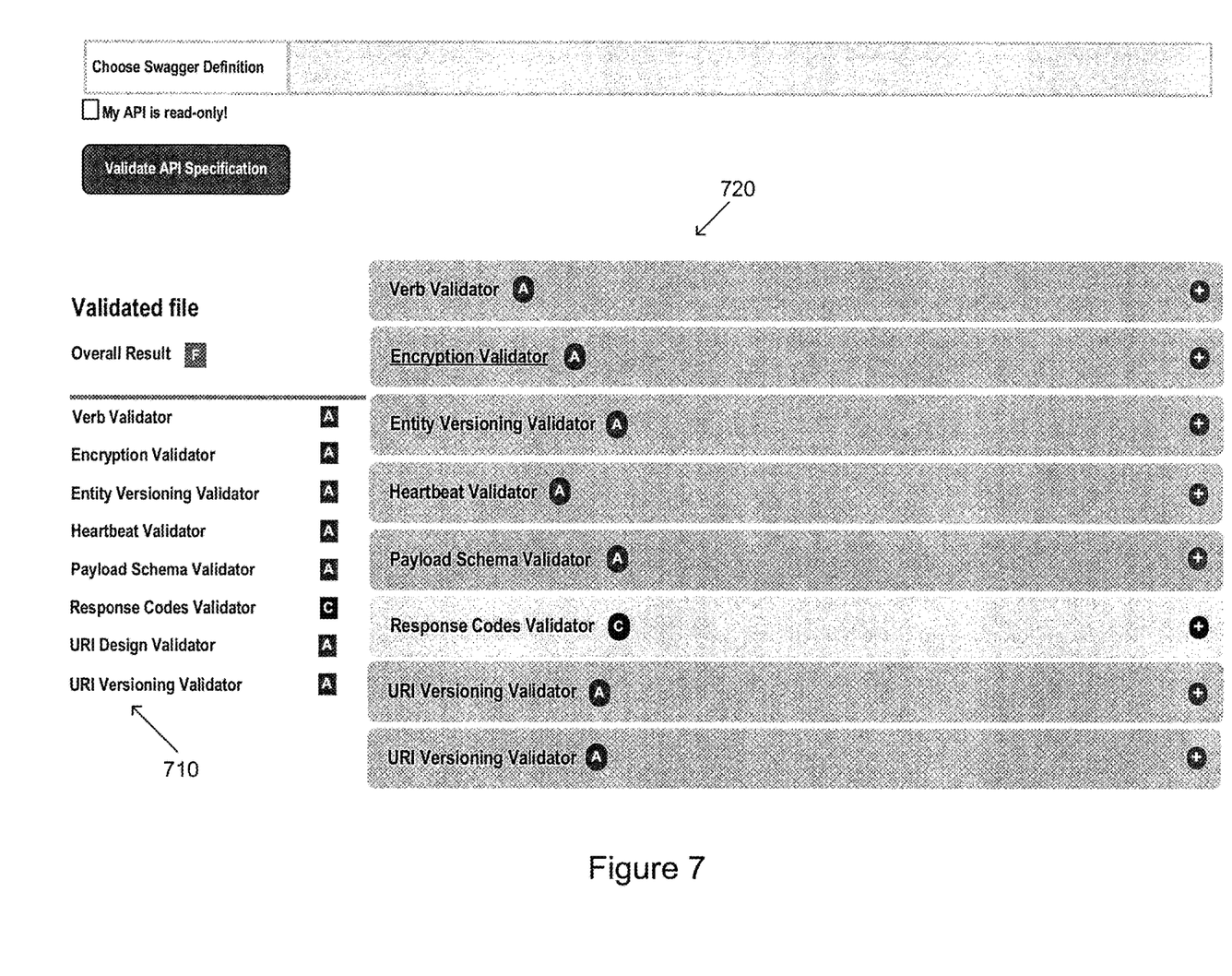
FIG. 7 illustrates exemplary screenshots of API Validation user interfaces, according to an exemplary embodiment.

FIG. 7 illustrates an API Validator interface that demonstrates a good file, according to an exemplary embodiment. Similar to FIG. 6, the Validated File may include a grade or score based on various features or validators at 710, such as Verb Validator, Encryption Validator, Entity Versioning Validator, Heartbeat Validator, Payload Schema Validator, Response Codes Validator, URI Design Validator and URI Versioning Validator. Additional Details for the grade/score may be provided at 720, by selecting a validator.

Figure 8:
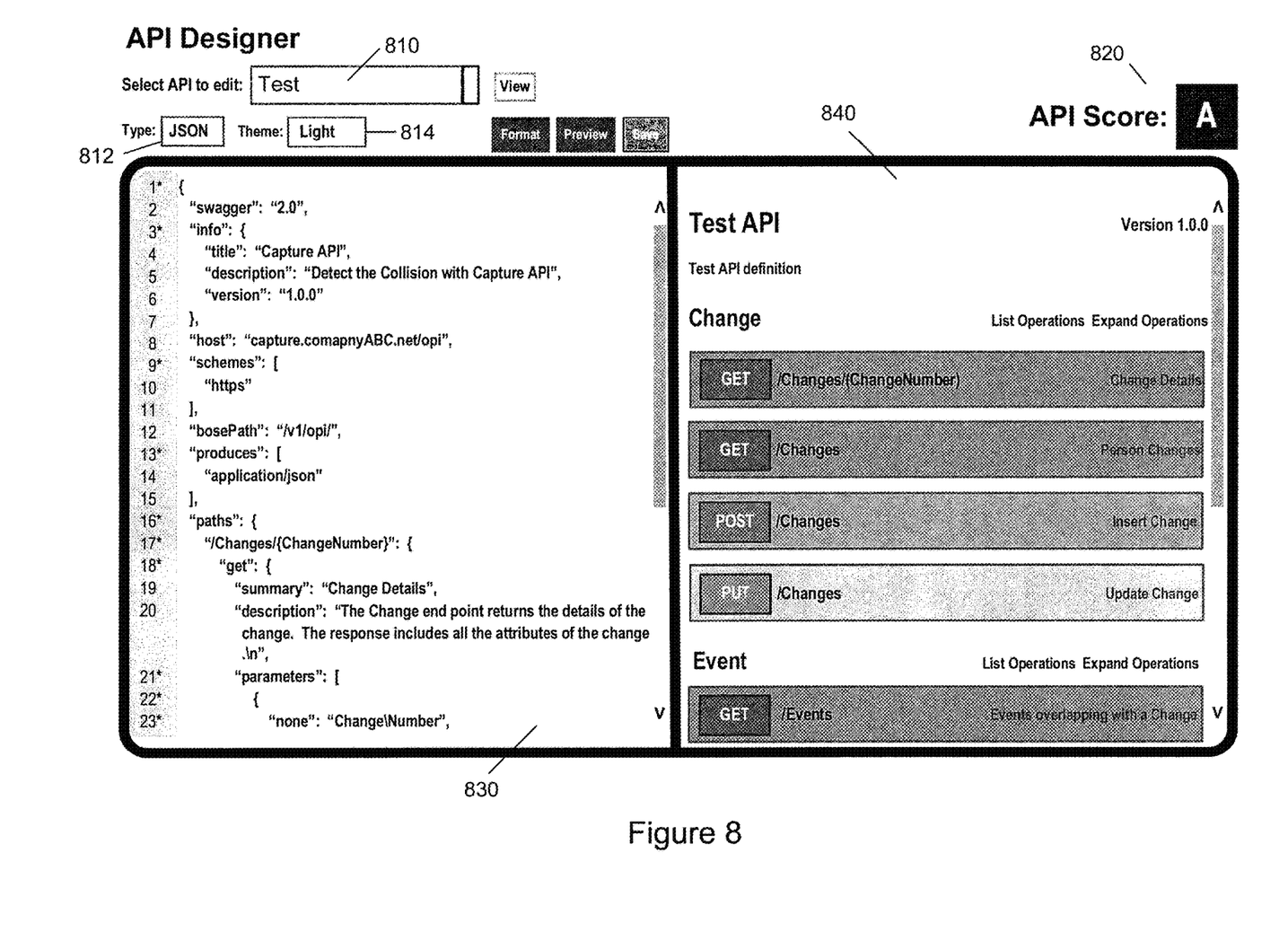
FIG. 8 illustrates exemplary screenshots of API Registry user interfaces which includes API validation functions, according to an exemplary embodiment.

FIG. 8 illustrates an API Registry user interfaces which includes API validation functions, according to an exemplary embodiment. The API Validator tool may be integrated with various other tools. FIG. 8 illustrates an exemplary illustration of integration with a registry tool As shown in FIG. 8, this designer interface may typically reside in an API registry tool or API management platform tool. FIG. 8 may include an API Interface 830 and a API Validation Interface 820. The user may select an API to edit, at 810. In this example, Test API has been selected. API Interface 830 may provide source code in various types at 812, e.g., JSON, and themes at 814, e.g., Light. Other factors may be selected and considered. The user may validate their API from within this designer tool.

Figure 9:
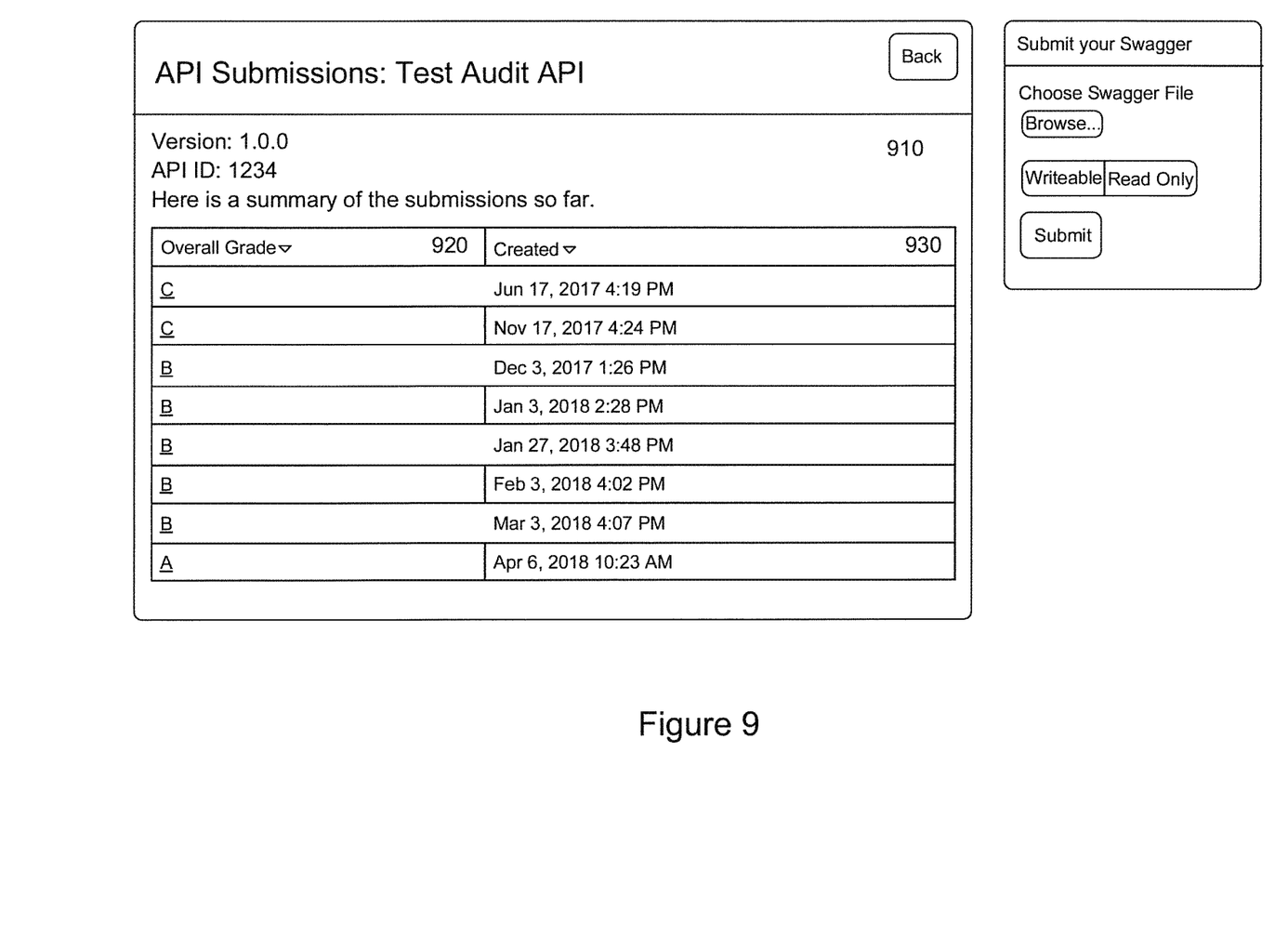
FIG. 9 illustrates an exemplary API Validation Score History, according to an exemplary embodiment.

FIG. 9 illustrates an exemplary API Validation Score History, according to an exemplary embodiment. FIG. 9 provides historical API validation scores for a particular API. Section 910 provides API identification information. Section 920 provides a history of API validation scores and Section 930 provides a date associated with the validation score. By selecting an API validation score, a user may view additional details, such as FIGS. 6 and 7.

An embodiment of the present invention may detect conformance to canonical models within an organization. For example, the system may use data analytic tools to detect deviation from these standards within an API and suggest corrections. For example, if an API is categorized as a trading application, but describes "Fixed Income" as "Bonds," the system may recognize that as a deviation.

An embodiment of the present invention may provide a suggestion facility that determines when not to create a new API but reuse an existing one because what is being propose is close (or sufficiently similar or related) to an already existing API.

An embodiment of the present invention may provide an effort estimation facility that analyze quality issues with an API and suggest an amount of effort or resources to fix or otherwise address an issue.

An embodiment of the present invention may provide a regional rule check that implements conformance to local standards. This may involve language (e.g., color vs. colour); checking data for local standards (e.g., data protection rules if an API appears to publish personal data) as well as other standards/considerations.

An embodiment of the present invention may provide a collaborative tool in the API registry directed to quality improvements based on standards. This may allow other developers in different teams to suggest specific fixes to APIs to improve their validation scores.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as a web-based system, other embodiments of the invention can be implemented using similar technologies, such as transmission of data that is displayed using an existing web browser on a user's mobile device and using a software application ("app") downloaded onto a user's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. An Application Program Interface (API) Validator Tool comprising:
   a first input coupled with a processor, configured to receive an API definition;
   a second input configured to receive API standards data;
   an API Registry component that stores and manages available APIs developed by one or more API developers, wherein the API Registry comprises API validation scores;
   an API Validator plug-in executing on a build platform and configured to perform the steps of:
   receive a trigger API test;
   determine whether an API exists;
   extract an API Specification from the API Registry wherein the API Validator plug-in parses the API Specification to identify the API definition;
   perform an API quality validation, wherein the validation is based on a comparison of the API Standards data with the API Specification and
   generate API status response message.

2. The API Validator Tool of claim 1, further comprising a metrics collection component.

3. The API Validator Tool of claim 1, wherein the API quality validation comprises the steps of:
   generating a set of validators; and
   identifying a score for each of the set of validators.

4. The API Validator Tool of claim 3, wherein the API quality validation comprises the step of:
   communicating, via an API Validator interface, the set of validators with corresponding scores.

5. The API Validator Tool of claim 3, wherein the API standards data comprises: API Convention, API Design, API Security, and API Data.

6. The API Validator Tool of claim 3, wherein the set of validators comprises: Verb Validator, Encryption Validator, Entity Versioning Validator, Heartbeat Validator, Payload Schema Validator, Response Codes Validator, Uniform Resource Identifier (URI) Design Validator and URI Versioning Validator.

7. The API Validator Tool of claim 1, wherein the API Registry comprises a collection of representational state transfer (REST) APIs.

8. The API Validator Tool of claim 1, wherein the API quality validation is performed during a build process.

9. A method for implementing an Application Program Interface (API) Validator Tool comprising the steps of:
   receiving a trigger API test;
   receiving API Standards data;
   determining whether an API exists;
   extracting an API Specification from an API Registry, wherein the API Registry stores and manages available APIs developed by one or more API developers and further comprises API validation scores, and wherein the API Validator tool parses an API Specification to identify an API definition;

performing, via an API Validator plug-in, an API quality validation by comparing the API Standards data with the API Specification, wherein the API Validator plug-in executes on a build platform; and generating API status response message.

10. The method of claim 9, wherein the API is validated based on the API Specification and the API Standards data.

11. The method of claim 9, further comprising the step of: performing a metrics collection.

12. The method of claim 9, further comprising the step of:
generating a set of validators; and
identifying a score for each of the set of validators.

13. The method of claim 12, further comprising the step of:
communicating, via an API Validator interface, the set of validators with corresponding scores.

14. The method of claim 12, wherein the API standards data comprises: API Convention, API Design, API Security, and API Data.

15. The method of claim 12, wherein the set of validators comprises: Verb Validator, Encryption Validator, Entity Versioning Validator, Heartbeat Validator, Payload Schema Validator, Response Codes Validator, Uniform Resource Identifier (URI) Design Validator and URI Versioning Validator.

16. The method of claim 9, wherein the API Registry comprises a collection of representational state transfer (REST) APIs.

17. The method of claim 9, wherein the API quality validation is performed during a build process.

18. An Application Program Interface (API) Validator Tool comprising:
a first input configured to receive an API definition;
a second input configured to receive API standards data;
an API Validator interface configured to display validation data;
a processor, coupled to the first input, the second input and the API Validator interface, configured to perform the steps of:
parsing an API Specification to identify the API definition and parsing the API definition to identify compliance with the API standards data;
generating a set of validators;
identifying a score for each of the set of validators; and
communicating, via the API Validator interface, the set of validators with corresponding scores.

19. The API Validator Tool of claim 18, wherein the API standards data comprises: API Convention, API Design, API Security, and API Data.

20. The API Validator Tool of claim 18, wherein the set of validators comprises: Verb Validator, Encryption Validator, Entity Versioning Validator, Heartbeat Validator, Payload Schema Validator, Response Codes Validator, URI Design Validator and URI Versioning Validator.

* * * * *